Sept. 15, 1964  F. PAGANO, SR  3,148,596
HYDRAULIC BRAKE CUP WITH EXPANDER
Filed Feb. 4, 1964  2 Sheets-Sheet 1

INVENTOR.
Frank Pagano, Sr.
BY
ATTORNEY

Sept. 15, 1964  F. PAGANO, SR  3,148,596
HYDRAULIC BRAKE CUP WITH EXPANDER
Filed Feb. 4, 1964  2 Sheets-Sheet 2
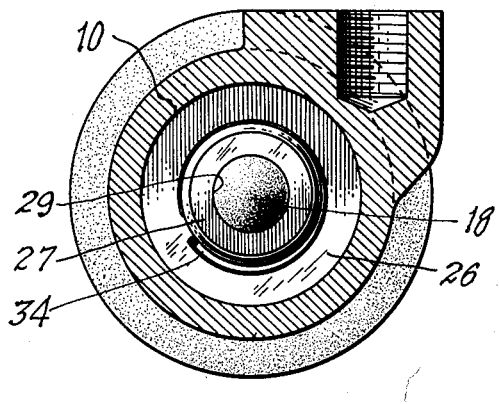
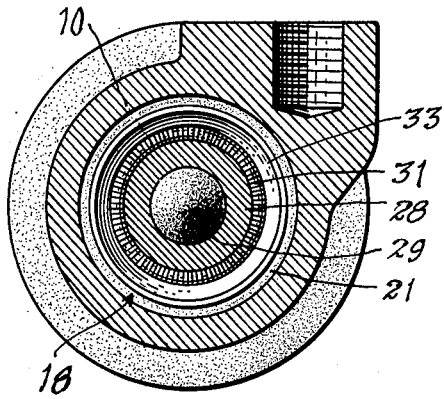
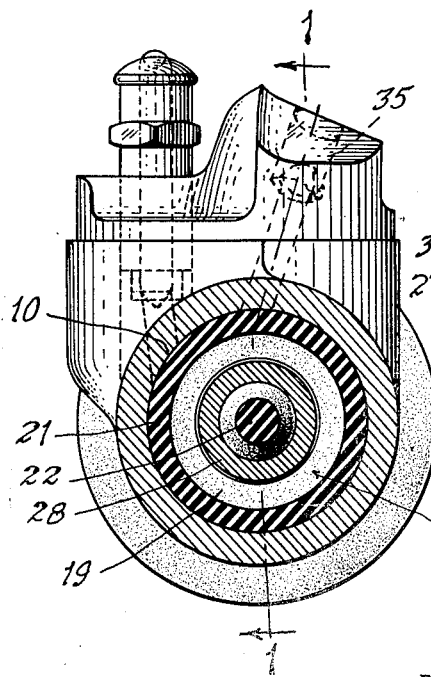
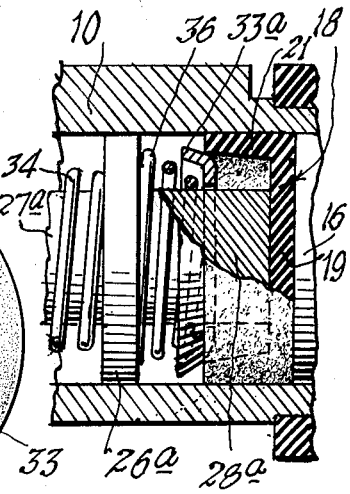
INVENTOR.
Frank Pagano, Sr.
BY
ATTORNEY

United States Patent Office 3,148,596
Patented Sept. 15, 1964

3,148,596
HYDRAULIC BRAKE CUP WITH EXPANDER
Frank Pagano, Sr., 88 N. 10th St., Newark, N.J.
Filed Feb. 4, 1964, Ser. No. 342,340
8 Claims. (Cl. 92—194)

This invention relates in general to a resilient or elastic brake cup formed of rubber or synthetic composition for a hydraulic brake system, and more particularly the invention is directed to means for expanding the edges of the resilient cup into contact with the walls of a cylinder with which the cup is associated.

Since the inception and adoption of hydraulic braking systems in automotive vehicles, the manufacturers have had to contend with the problems of leaking braking cylinders and other braking system failures which have been directly traceable to the collapsing inward of the side walls or circular lips of the rubber sealing cups within the hydraulic brake wheel cylinders as a result of heating effects created by high-speed braking. Attempts to overcome this problem have resulted in the use of flat cup expanders inside the rubber cups, but this practice subsequently created other problems because, with the flat cup expanders installed, lubricating fluid has been prevented from reaching the wheel cylinder pistons behind the cups, causing seizing of the wheel cylinder and consequent dragging brakes.

A primary object of the invention is to provide a novel and improved brake cup expander which will overcome the above-mentioned difficulties and insure longer life for wheel cylinder components as well as increased brake system safety and reliability.

In its broader aspects, the invention contemplates the provision of means of applying enough internal pressure on the wheel cylinder cups to prevent collapse of the side walls or lip portions of the cups under conditions of abnormal heating and, at the same time, permit controlled lubrication of the pistons behind the cups, whereby increased brake system safety, less maintenance and extended life for the wheel cylinder assembly, shall be insured.

Another object of the invention is to provide a novel and improved construction and combination of a wheel cylinder piston, a resilient or elastic sealing cup and an expander ring that is continuously yieldingly pressed into contact with the inner surfaces of the side walls or lip portions of the sealing cup.

Other objects, advantages and results of the invention will be brought out by the following description in conjunction with the accompanying drawings in which FIGURE 1 is a longitudinal vertical sectional view, approximately on the plane of the line 1—1 of FIGURE 5, of a brake wheel cylinder assembly including the brake cup expander, component parts being shown in the positions which the parts assume when newly installed;

FIGURE 3 is a transverse vertical sectional view on the plane of the line 3—3 of FIGURE 1;

FIGURE 4 is a similar view on the plane of the line 4—4 of FIGURE 1;

FIGURE 5 is a transverse vertical sectional view on the plane of the line 5—5 of FIGURE 1;

FIGURE 7 is a fragmentary sectional view of one end of the assembly showing a modification of the invention.

Figure 1:
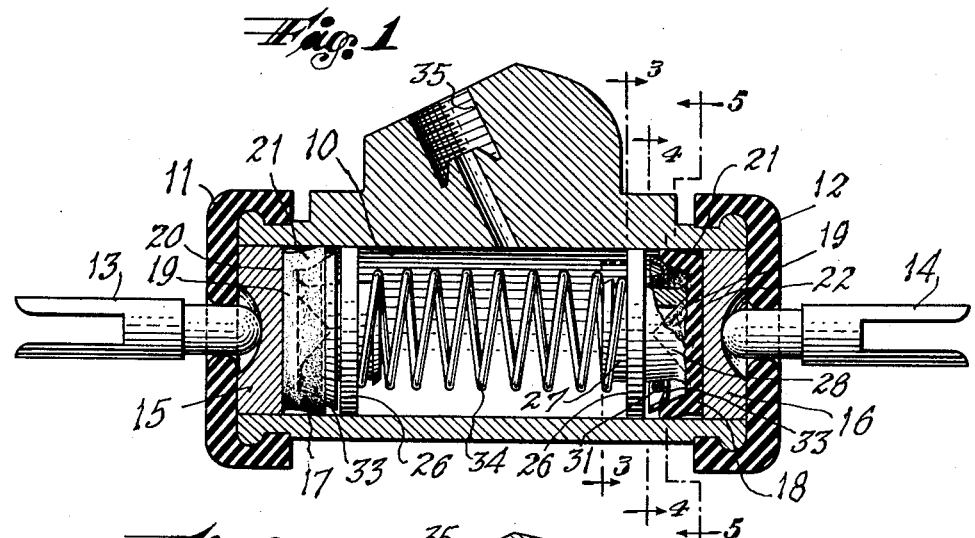

Specifically illustrating the embodiment of the invention, the complete wheel cylinder assembly comprises a cylinder 10 having flexible end walls, caps or boots 11 and 12 respectively through which reciprocate the push rods 13 and 14 that engage the respective pistons 15 and 16. Abutting the inner end surface of the pistons 15 and 16 are the respective resilient or elastic sealing cups 17 and 18 that are formed of rubber or other suitable synthetic resilient or elastic material. Each sealing or packing cup comprises a circular base portion 19 having a flat bottom surface 20 that abuts the corresponding piston, and an annular side wall or lip portion 21 that extends outwardly of the periphery of the base portion; and preferably a solid conical boss 22 is formed integrally with the base portion and extends outwardly from the center thereof with its apex projecting beyond the edge of the lip 21. The lip portion is shaped with an outwardly and laterally flaring outer surface 23 and an outwardly and laterally flaring inner surface 24 that continues into an annular groove 25 between the lip portion and the boss portion.

Figure 2:
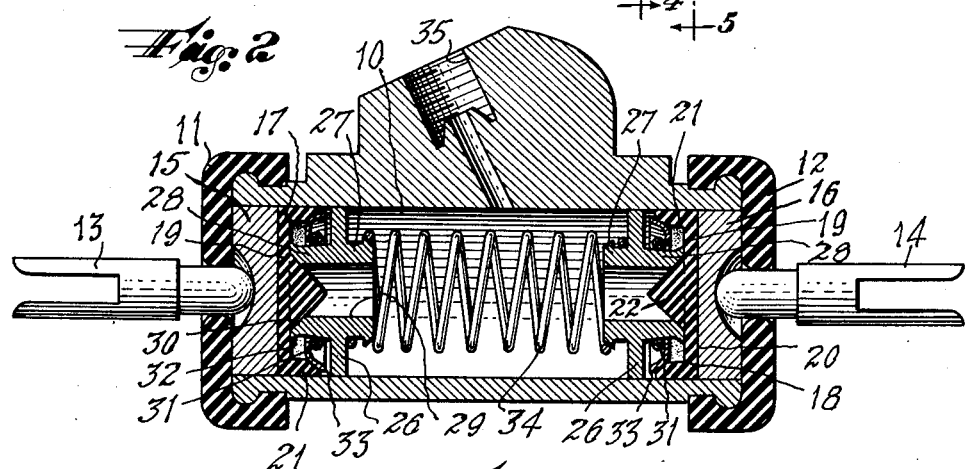
FIGURE 2 is a similar view, showing the parts in the positions assumed after prolonged use of the wheel cylinder assembly.
Figure 6:
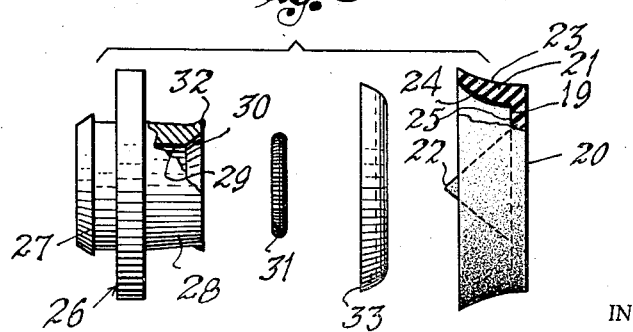
FIGURE 6 is an exploded side elevational view of a wheel cylinder expander body, a sealing cup, an expander ring and a garter spring associated with the body and the expander ring.

The expander comprises an annular expander body 26 that is circular and of a diameter slightly less than the internal diameter of the cylinder 10 so as to be freely slidable in the cylinder; and projecting from each of opposite sides of the body are the respective annular bosses 27 and 28. As shown, preferably there is an opening 29 extending through the body, and the end of said opening at the outer end of the boss 28 is provided with a frusto-conical surface 30 to abut the conical boss 22 of the cup as best shown in FIGURE 2. The exterior surface of the boss 28 is also frusto-conical and has the end with its smallest diameter adjacent the outer end of the boss. Encircling the boss is a circular helical spring 31, commonly called a garter spring which is normally held against accidental displacement from the boss by an outturned or upset edge portion 32 on the boss. Interposed between the expander body 26 and the lip portion of the sealing cup, and loosely encircling the boss 28 is an expander ring or washer 33 which is shown of dished sheet metal with its outer convex surface abutting the inner surface of the lip portion 21 of the sealing cup. The concave side of the expander ring is abutted by the garter spring 31 so that the tendency of the garter spring to contract on the frusto-conical outer surface of the boss tends to force the expander ring longitudinally of the boss, or coaxially with the expander body, in such a way as to press the expander ring into yielding contact with the lip portion of the sealing cup.

Two of the cups and corresponding expanders are shown as assembled in the wheel cylinder 10 with a helical compression spring 34 interposed between the two expander bodies, the spring 34 normally pressing the sealing cups against their respective pistons 15 and 16 and also holding the pistons in contact with their respective push rods 13 and 14.

FIGURE 1 of the drawings shows the assembly with the parts in the positions that they assume when newly installed with no wear on the sealing cups. Each garter spring 31 exerts controlled and equal pressure on all adjacent surfaces of the corresponding expander ring 33 which in turn exerts sufficient control pressure on the lip portions of the sealing cup to seal against leakage the hydraulic fluid that is admitted into the cylinder through the inlet 35, and to prevent the inward collapse of the lip portions of the sealing cup under conditions of abnormal heating. The expander assembly is designed so as to permit a controlled amount of hydraulic fluid to escape over the lip portion of the cup thereby providing lubrication for the corresponding piston 15 or 16 as the latter slides in the cylinder 10. Preventing collapse of the sealing cup in this fashion, prevents leakage from the brake cylinder and consequently loss of braking action; while providing for controlled lubrication of the pistons 15 and 16 prevents seizing of the pistons in the cylinder and insures adequate lubrication to prevent brake dragging.

FIGURE 2 shows the parts in the position assumed when the assembly has been in use for a long time, the expander having compensated for the wear of the sealing cup. Each garter spring exerts a constant controlled pressure on the corresponding expander ring 33 which in turn exerts constant controlled pressure on the inner surfaces of the lip portions of the sealing cup, thereby constantly compensating for wear of the cup during use of the wheel cylinder assembly over long periods of time, while at the same time insuring adequate lubrication to the corresponding pistons 15 or 16.

The wear compensation and the piston lubrication effectively insure long life for the assembly and at the same time increases the safety factor of the brake system and reduces the maintenance requirements for the assembly.

In some cases, especially where the parts are large, it is desirable to substitute for the garter spring another type of spring, for example a helical conical spring or a helical cylindrical spring such as the spring 36 in FIGURE 7. The spring is interposed between the concave side of the expander ring 33a and the side of the expander body 26a and the boss 28a may be purely cylindrical instead of frusto-conical. The garter spring is especially effective where the parts and the spaces between them are small and a compact assembly is required, but in larger devices the other types of springs may be preferred. The boss 22 may be omitted and the boss 28a may be solid without an opening or recess.

While a wheel cylinder assembly including two elastic sealing cups has been shown, it should be understood that the expander of the invention may be embodied in other assemblies where only one sealing cup is required. Also, while the invention has been shown as embodied in the specific structural details, it will be understood that the construction of the various parts of the assembly may be modified and changed within the spirit and scope of the invention.

I claim:

1. The combination with a cylinder and a piston slidably therein, of an elastic sealing cup having a circular base abutting one side of said piston and an integral circular lip extending from the periphery and one side of the base and engaging the cylinder wall, an expander body slidably mounted in said cylinder having a portion to abut said base of the sealing cup and another portion in spaced relation to the sealing cup and opposed to said lip, an expander ring between said expander body and said sealing cup engageable with the inner surface with said lip, said expander ring and the inner surface of said lip having coacting portions to press said lip outwardly upon movement of said expander ring toward the sealing cup, and yielding means interposed between said expander body and said expander ring normally to urge said expander ring into engagement with said lip and thereby expand the lip outwardly.

2. The combination as defined in claim 1 with the addition of means normally yieldingly urging said expander body toward said sealing cup and said piston.

3. The combination as defined in claim 1 wherein the first-mentioned portion of the expander body is a boss and the last-named means is a spring encircling said boss.

4. The combination as defined in claim 1 wherein the first-mentioned portion of the expander body is a frusto-conical boss whose smaller diameter is at its free end, and the last-named means comprises a garter spring snugly encircling said boss and abutting said expander ring.

5. An elastic sealing cup and an expander therefor, said sealing cup having a base and an integral circular lip extending from the periphery and one side of the base, an expander body having a portion to abut said base of the sealing cup and another portion in spaced relation to the sealing cup and opposed to said lip, an expander ring between said expander body and said sealing cup engageable with the inner surface with said lip, said expander ring and the inner surface of said lip having coacting portions to press said lip outwardly upon movement of said expander ring toward the sealing cup, and yielding means interposed between said expander body and said expander ring normally to urge said expander ring into engagement with said lip and thereby expand the lip outwardly.

6. An elastic sealing cup and an expander therefor as defined in claim 5 and wherein the first-mentioned portion of the expander body is a boss and the last-named means is a spring encircling said boss.

7. An elastic sealing cup and an expander therefor as defined in claim 5 and wherein the first-mentioned portion of the expander body is a frusto-conical boss whose smaller diameter is at its free end, and the last-named means comprises a garter spring snugly encircling said boss and abutting said expander ring.

8. An elastic sealing cup and an expander therefor as defined in claim 3 wherein the base of said sealing cup has a central conical boss on its inner side, and said expander body has a frusto-conical recess the side walls of which engage the sides of said conical boss.

References Cited in the file of this patent

UNITED STATES PATENTS

| | | |
|---|---|---|
| 2,612,420 | Reynolds | Sept. 30, 1952 |
| 2,725,267 | Keller | Nov. 29, 1955 |
| 3,064,430 | Reynolds | Nov. 20, 1962 |